(12) United States Patent
Siegfriedsen

(10) Patent No.: US 8,508,060 B2
(45) Date of Patent: Aug. 13, 2013

(54) HYDRAULIC SUPPLY UNIT

(75) Inventor: Soenke Siegfriedsen, Rendsburg (DE)

(73) Assignee: Aerodyn Engineering GmbH, Rendsburg (DE)

(*) Notice: Subject to any disclaimer, the term of this patent is extended or adjusted under 35 U.S.C. 154(b) by 94 days.

(21) Appl. No.: 13/128,431

(22) PCT Filed: Nov. 6, 2009

(86) PCT No.: PCT/DE2009/001574
§ 371 (c)(1),
(2), (4) Date: May 10, 2011

(87) PCT Pub. No.: WO2010/054629
PCT Pub. Date: May 20, 2010

(65) Prior Publication Data
US 2011/0247710 A1 Oct. 13, 2011

(30) Foreign Application Priority Data

Nov. 14, 2008 (DE) .......................... 10 2008 057 455

(51) Int. Cl.
*F03D 7/00* (2006.01)
(52) U.S. Cl.
USPC .................. 290/44; 290/1 R; 290/55; 137/343
(58) Field of Classification Search
USPC ....... 137/340, 565.01, 343; 60/398; 415/4.3, 415/4.5; 290/44, 55, 1 R; 184/4, 6.12
See application file for complete search history.

(56) References Cited

U.S. PATENT DOCUMENTS

| 4,503,673 A | 3/1985 | Schachle et al. |
| 4,527,072 A * | 7/1985 | van Degeer ..................... 290/55 |
| 4,721,185 A * | 1/1988 | Weigle .......................... 184/6.12 |
| 4,960,167 A * | 10/1990 | Stenlund ....................... 165/286 |
| 7,168,251 B1 * | 1/2007 | Janssen ......................... 60/641.1 |
| 7,220,104 B2 * | 5/2007 | Zheng et al. .................. 416/145 |
| 2004/0069252 A1 * | 4/2004 | Olson ........................ 123/41.27 |
| 2006/0170222 A1 * | 8/2006 | Zambrano et al. .............. 290/55 |

FOREIGN PATENT DOCUMENTS

| WO | WO 03/091577 | 11/2003 |
| WO | WO 2007/071239 | 6/2007 |
| WO | WO 2008/000268 | * 1/2008 |

* cited by examiner

Primary Examiner — Craig Schneider
Assistant Examiner — Kevin Murphy
(74) Attorney, Agent, or Firm — Diederiks & Whitelaw, PLC

(57) ABSTRACT

A hydraulic supply unit for lubricating and/or cooling mechanical and electrical components disposed in the nacelle of a wind power plant, and for supplying hydraulic actuating devices with hydraulic fluid, characterized by a tank that is divided into chambers and has a first chamber for providing oil lubricating the gearbox of the wind power plant, a second chamber for providing hydraulic oil used to operate hydraulic actuating devices of the wind power plant, a first connection for connecting the first chamber to a line for supplying the gearbox with lubricating oil, and a second connection for connecting the second chamber to a line for supplying the hydraulically operated actuating devices with hydraulic oil, and a heat exchanger for dissipating heat from the hydraulic oil, the gearbox oil and a coolant that is fed to the heat exchanger and absorbs lost heat at the electrical components of the wind power plant.

19 Claims, 3 Drawing Sheets

HYDRAULIC SUPPLY UNIT

CROSS-REFERENCE TO RELATED APPLICATIONS

This application represents a National Stage application of PCT/DE2009/001574 entitled "Hydraulic Supply Unit" filed Nov. 6, 2009, pending.

BACKGROUND OF THE INVENTION

1. Field of the Invention

The invention relates to a hydraulic supply unit for lubricating and/or cooling mechanical and electrical components disposed in the nacelle of a wind power plant, and for supplying hydraulic actuating devices with hydraulic fluid.

2. Discussion of the Prior Art

In wind power plants mechanical, electrical, and hydraulic components are required that need lubricating and/or cooling or being supplied with hydraulic fluids. Hydraulic units are for example used for controlling the rotor brake, the yaw brake, the blade adjusting cylinder, the rotor locking bolts; in the process also lubrication of components such as the gearbox, and dissipating lost heat taking place by means of the fluids transported in the hydraulic systems. Thus the generator, the power electronics system and the transformer must be cooled, the gearbox lubricated and cooled and the hydraulic system must be supplied with a pressure fluid and cooled.

A disadvantage with the design of presently existing wind power plants is that installing such hydraulic supply units requires much effort and time. The units must be brought into the nacelle one by one, must be attached there individually and also connected individually. On top of this it is a disadvantage that each unit has to be tested on its own in terms of the function carried out by itself and tested together with the other components like the sensors and the electric system of the plant in terms of its interaction with the other components of the wind power plant. It has to be stated in summary that the installation of these individual supply units so far usually carried out at different places in the nacelle leads to a wind power plant design that is prone to malfunctions.

The object of the invention is therefore to produce a hydraulic supply unit that can be installed in a simple, fast, and safe manner, the object being in particular to reduce the testing phase of newly installed supply units to a minimum.

SUMMARY OF THE INVENTION

The basic idea of the invention is to combine the hydraulic components needed in a wind power plant to a functional unit that can be pre-assembled and above all tested comprehensively after production prior to the hydraulic supply unit being taken to the wind power plant and installed there. The inventive hydraulic supply unit ensures that checking of the hydraulic supply units that is until now carried out according to the state of the art in situ can now be integrated as far as possible into the production process of the component manufacturer and that as a result the installation time and the testing effort during final assembly of wind power plants at the manufacturer of the wind power plant can be reduced. Connecting the hydraulic supply unit according to the invention takes place after its installation into the wind power plant preferably via connections provided at the supply unit that are designed as plug or screw-type connections, the fluid-carrying lines being preferably connected via screw-type connections. Connecting the supply unit to electric leads however is preferably done via plug-type connections.

In this way the pipes that are already installed in the nacelle of the wind power plant and lead to the devices that are to be supplied by the supply unit, can be connected, for example by means of short hose connections to the connections (designed as screw-type connections) of the supply unit, so that by using flexible hoses sufficient tolerance is provided when connecting the supply unit. After the electric cables have been directly connected to the connections (designed as plug-type connections) of the supply unit, the ensuing check of the components of the supply unit can be limited to a simple functional test.

It is particularly advantageous if the supply unit is supported on a base plate that is a constructive part of the wind power plant, e.g. a base plate in the region of the yaw bearing, since this can lead to a compact and stable construction. Particularly preferably the tank of the supply unit is connected to the base plate via vibration absorbers that ensure support of the supply unit in a way that absorbs vibrations of the plant.

The invention is explained in more detail using a particularly preferred exemplary embodiment shown in the drawings, in which:

DETAILED DESCRIPTION OF THE INVENTION

Figure 1:
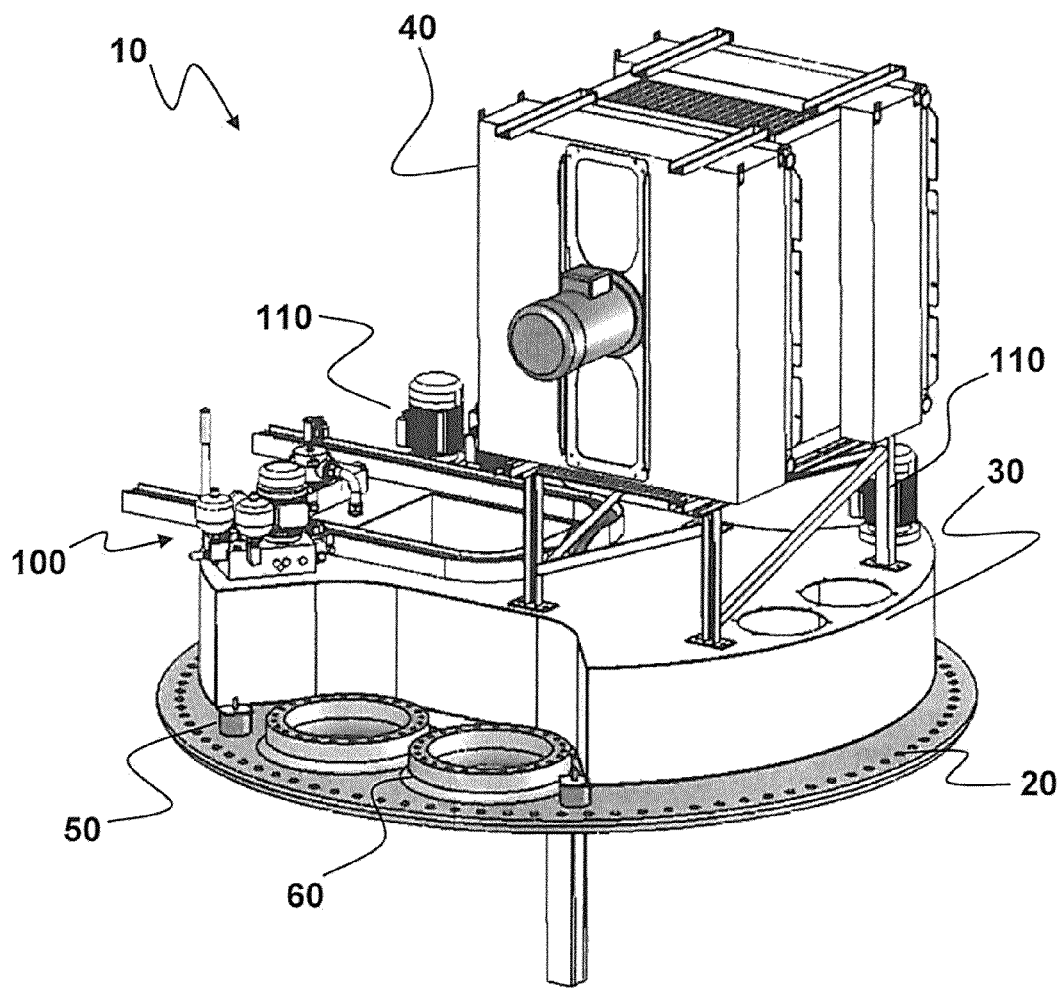
FIG. 1 shows a perspective view of the inventive hydraulic supply unit.

FIG. 1 shows a perspective view of the hydraulic supply unit according to the invention. The hydraulic supply unit 10 consists of a base plate 20 on which the tank 30 is disposed. The tank 30 exhibits a first chamber 30a for the feeding and cooling of oil that lubricates the gearbox of the wind power plant and a second chamber 30b for providing hydraulic oil used to operate hydraulic actuating devices of the wind power plant. If need be a third chamber 30c is provided for feeding a liquid, e.g. water, preferably a water/glycol mixture, used to cool the generator.

In addition the inventive hydraulic supply unit 10 also has a heat exchanger 40 or a unit having two or more heat exchangers for dissipating the lost heat to the surroundings or outside air, that is preferably firmly connected to the tank 30.

Figure 4:
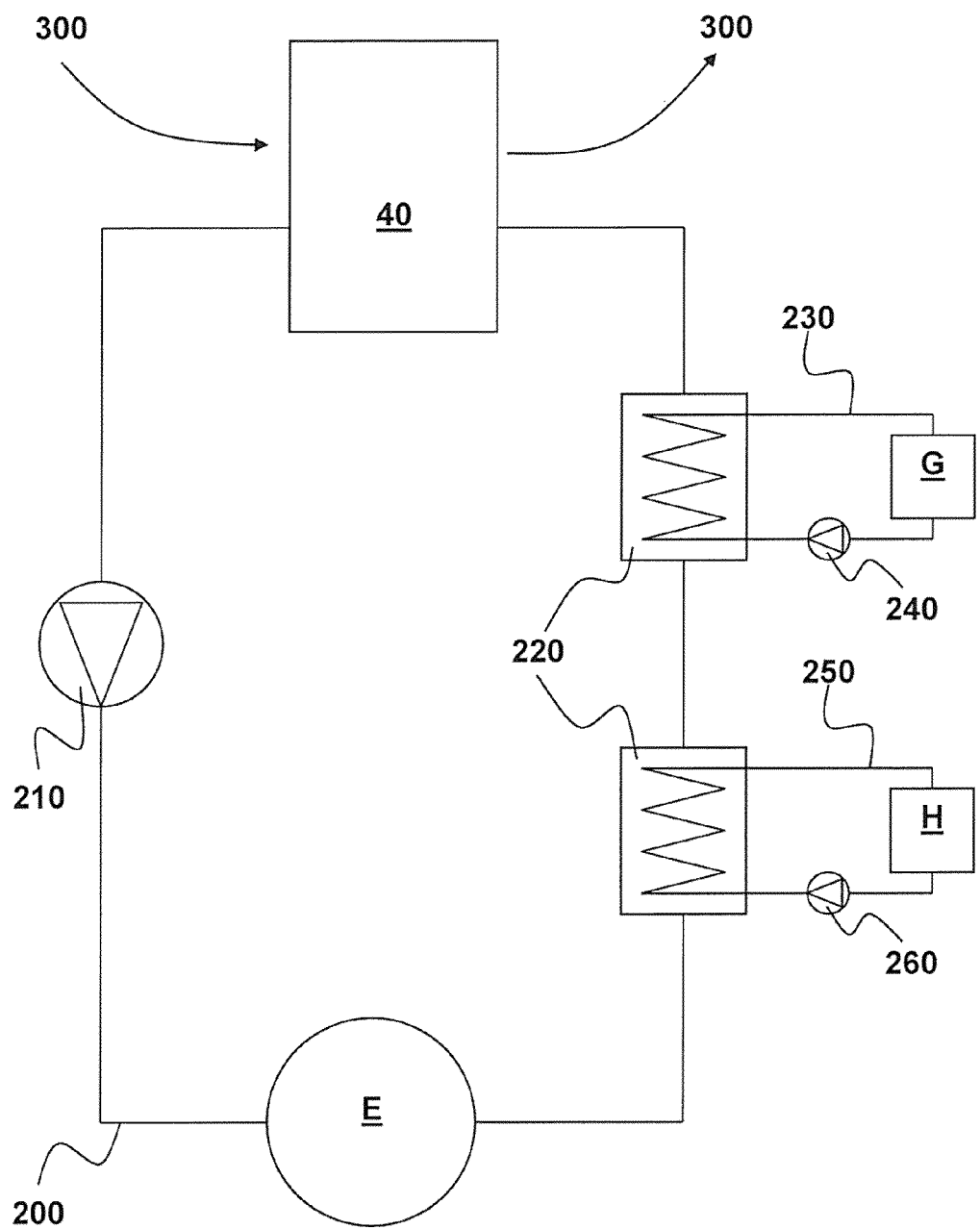
FIG. 4 shows a schematic view of a cooling circuit of particularly preferred design.

The heat exchanger 40 preferably exhibits a cooling circuit 200 that is shown schematically in FIG. 4 and carries a coolant, preferably a water/glycol mixture. The coolant circulating in the cooling circuit as a result of the pump 210 absorbs the lost heat from the wind power plant at the electrical components E of the wind power plant and dissipates it to the heat exchanger 40. The heat transported by the coolant is then output to the surrounding or outside air 300 in the heat exchanger 40 by means of an air flow that is guided through the heat exchanger 40—as indicated by the arrows.

Particularly preferably at least one further heat exchanger 220 is provided in the coolant circuit that dissipates the heat carried by the hydraulic oil or the gearbox oil to the coolant. To this end also the hydraulic oil and the gearbox oil can be guided in a circuit 230, 250 that is driven by pumps 240, 260, the at least one heat exchanger 220 being preferably disposed downstream from the electrical components E. This achieves a particularly simple but efficient design for dissipating the lost heat transported by the hydraulic or gearbox oil away from the gearbox G and the hydraulic components H.

The cooling circuit can finally be supplied in the process with coolant from the third chamber. In addition to this preferred embodiment, also several cooling circuits that carry a coolant can be provided, e.g. one each for the electrical components, for the mechanical components and for the hydraulic components. Likewise the hydraulic oil and/or the gearbox oil can also be guided directly to the heat exchanger 40 without a further coolant being required.

Even though this is not explained in more detail, the person skilled in the art appreciates that the supply unit 10 has control units 90 (partly shown in the figures) (see FIG. 3), valves 100, pumps 110, filters, maintenance openings, sensors for measuring the temperature, the filling level of the pressure or the flow rate, and heating elements that are to ensure fault free operation as required.

Also not illustrated are the lines that receive the fluids and connect the tank 30 with the heat exchanger 40. Not shown, despite existing, are the connections for connecting the supply unit, that is to say the first chamber and the second chamber to lines, for example by means of flexible (hose) lines, for supplying the gearbox with lubricating oil and for supplying the hydraulically operated actuating devices with hydraulic oil, that is to say generally those liquids for carrying out the lubricating, hydraulic and cooling functions at the respective mechanical and hydraulic and the electrical components.

Figure 2:
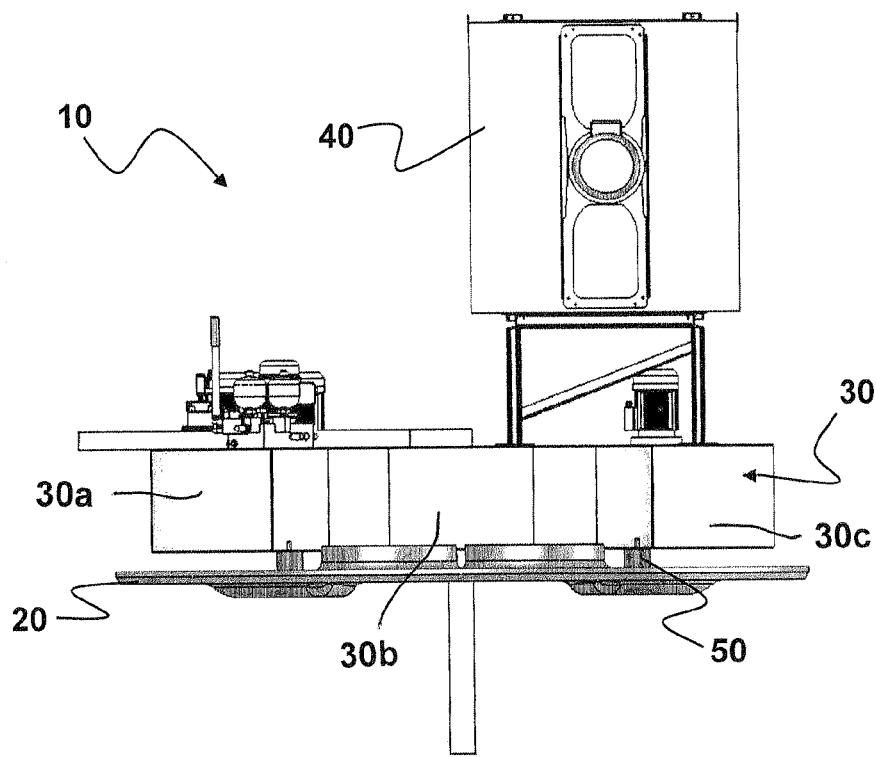
FIG. 2 shows an elevation view of the supply unit of FIG. 1.
Figure 3:
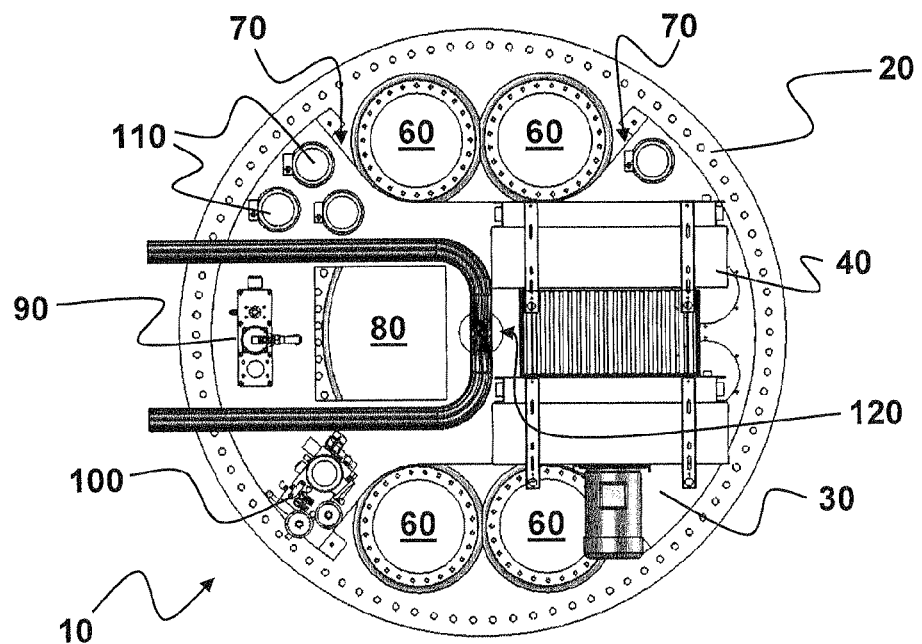
FIG. 3 shows a top view of the supply unit of FIG. 1 and/or FIG. 2.

FIG. 2 and FIG. 3 show the hydraulic supply unit 10 according to the invention in an elevation view and a top view. Here it can be seen on the one hand that the hydraulic supply unit 10 enables a very complex design and at the same time the accessibility of all elements remains.

To prevent damage to the supply unit 10 on account of vibrations preferably of its bottom side it is in particular provided that the supply unit 10 has vibration absorbers 50 and is supported by means of these on the base plate 20 in the region of the yaw bearing of a wind power plant. The base plate 20 and the tank 30 then have a manhole 80 that makes possible via the tower of a wind power plant to climb up and into the nacelle. Just next to the manhole a cable bushing 120 is preferably disposed for passing through and laying the electrical connections from the nacelle into the base region of the tower that are preferably achieved by plug-type connections The base plate 20 also has receptacles 60 for receiving motors for the yaw drive, that is the drive for aligning the rotor axis to the direction of the wind. To still keep the hydraulic supply unit 10 compact it is therefore preferably envisaged that the tank 30 has recesses 70 in the space that is to be occupied by the motors.

According to a particularly preferred exemplary embodiment it is finally also envisaged to dispose on the bottom side of the tank 30 of the supply unit 10 further connections for feeding and/or draining the hydraulic oil, the lubricating oil or the coolant. So that these connections provided for commissioning or for maintenance purposes, e.g. for topping up the tanks and totally draining the tanks can be better accessed it is specially provided that the base plate 20 exhibit openings (not shown) in the region of these (maintenance) connections through which these connections can be accessed. The hydraulic, lubricating or coolants can then be replaced by connecting hoses to the tank connections (not shown) that are fitted with valves and that supply or drain the respective fluid.

The invention claimed is:

1. A hydraulic supply unit for lubricating and/or cooling mechanical and electrical components disposed in a nacelle of a wind power plant, and for supplying hydraulic actuating devices with hydraulic fluid, comprising;
   a tank divided into chambers and including:
      a first chamber for providing oil lubricating a gearbox of a wind power plant,
      a second chamber, fluidly isolated from the first chamber, for providing hydraulic oil used to operate hydraulic actuating devices of the wind power plant,
      a first connection for connecting the first chamber to a line for supplying the gearbox with lubricating oil, and
      a second connection for connecting the second chamber to a line for supplying the hydraulically operated actuating devices with hydraulic oil, and
   a heat exchanger for dissipating heat from the hydraulic oil, the lubricating oil and a coolant that is fed to the heat exchanger and absorbs lost heat at electrical components of the wind power plant, wherein the hydraulic supply unit is pre-assembled and can be tested as a functional unit prior to being installed in the wind power plant.

2. The hydraulic supply unit according to claim 1, wherein the coolant is guided in a cooling circuit.

3. The hydraulic supply unit according to claim 2, wherein the cooling circuit exhibits at least one further heat exchanger for dissipating heat from the gearbox oil and/or the hydraulic oil to the coolant.

4. The hydraulic supply unit according to claim 3, wherein the at least one further heat exchanger is disposed downstream of the electric components.

5. The hydraulic supply unit according to claim 1, wherein, the tank has a third chamber for providing coolant.

6. The hydraulic supply unit according to claim 1, wherein the supply unit is disposed on a base plate.

7. The hydraulic supply unit according to claim 1, wherein the tank has vibration absorbers.

8. The hydraulic supply unit according to claim 1, wherein the tank includes a base plate having at least one receptacle for a yaw drive motor and the tank has a receptacle in the space to be occupied by the motor.

9. The hydraulic supply unit according to claim 1, wherein the tank is provided with a manhole.

10. The hydraulic supply unit according to claim 1, wherein the first and second connections for supplying the lubricating oil and the hydraulic oil, as well as a connection for cooling water, are disposed on a bottom side of the tank.

11. A hydraulic supply unit for dissipating heat from mechanical and electrical components for mounting in a nacelle of a wind power plant comprising:
   a first circuit providing oil for lubricating a gearbox of the wind power plant, said first circuit including a first pump for directing the oil through the gearbox and a first heat exchanger;
   a second circuit providing hydraulic oil to operate hydraulic actuating devices of the wind power plant, said second circuit including a second pump for directing the hydraulic oil to the hydraulic components and a second heat exchanger, said second circuit being fluidly isolated from the oil of the first circuit; and
   a main cooling circuit including a main heat exchanger in fluid communication with each of the first and second heat exchangers for dissipating heat from both the lubricating oil of the first circuit and the hydraulic oil of the second circuit, as well as absorbing lost heat from electrical components of the wind power plant, said main cooling circuit including a main pump providing a flow of coolant delivered about the first, second and main heat exchangers, as well for the electrical components, said main cooling circuit being fluidly isolated from both the oil for lubricating of the first circuit and the hydraulic oil of the second circuit, wherein the hydraulic unit is pre-assembled and can be tested as a functional unit prior to being installed in a wind power plant.

12. The hydraulic supply unit according to claim 11, wherein the first and second circuits are fixedly connected to a tank disposed in the nacelle of the wind power plant.

13. The hydraulic supply unit according to claim 12, wherein the main heat exchanger is arranged outside of the tank.

14. The hydraulic supply unit according to claim 13, further comprising: a base upon which the tank is mounted.

15. The hydraulic supply unit according to claim 13, further comprising: vibration absorbers for the tank.

16. The hydraulic supply unit according to claim 12, wherein the tank is provided with a manhole.

17. The hydraulic supply unit according to claim 11, wherein each of the first and second heat exchangers are located downstream of the electric components in the main cooling circuit.

18. The hydraulic supply unit according to claim 17, wherein the main heat exchanger is located downstream of each of the first and second heat exchangers.

19. The hydraulic supply unit according to claim 11, further comprising a tank divided into chambers, including a first chamber for the oil for lubricating of the first circuit and a second chamber for the hydraulic oil of the second circuit.

* * * * *